(12) United States Patent
Mendoza et al.

(10) Patent No.: US 9,864,980 B2
(45) Date of Patent: Jan. 9, 2018

(54) AUTOMATIC PROCESSING OF FOREIGN CURRENCY TENDERINGS

(71) Applicants: Joseph Jover Piñon Mendoza, Mandaue (PH); Robyn Cortes Zambo, Mandaue (PH)

(72) Inventors: Joseph Jover Piñon Mendoza, Mandaue (PH); Robyn Cortes Zambo, Mandaue (PH)

(73) Assignee: NCR Corporation, Duluth, GA (US)

( * ) Notice: Subject to any disclaimer, the term of this patent is extended or adjusted under 35 U.S.C. 154(b) by 108 days.

(21) Appl. No.: 14/631,393

(22) Filed: Feb. 25, 2015

(65) Prior Publication Data

US 2016/0247136 A1 Aug. 25, 2016

(51) Int. Cl.
| | |
|---|---|
| G06Q 20/20 | (2012.01) |
| G06Q 20/38 | (2012.01) |
| G07G 1/00 | (2006.01) |
| G07G 3/00 | (2006.01) |
| G07F 7/04 | (2006.01) |

(52) U.S. Cl.
CPC ......... *G06Q 20/202* (2013.01); *G06Q 20/381* (2013.01); *G07F 7/04* (2013.01); *G07G 1/0036* (2013.01); *G07G 3/00* (2013.01)

(58) Field of Classification Search
CPC .................... G06Q 20/202; G06Q 20/381
USPC .................... 235/379, 380, 454
See application file for complete search history.

(56) References Cited

U.S. PATENT DOCUMENTS

2012/0185393 A1* 7/2012 Atsmon ............... G06Q 20/10
705/44

FOREIGN PATENT DOCUMENTS

JP 2004213141 A * 7/2004 ............... G07G 1/12

* cited by examiner

*Primary Examiner* — Toan Ly
(74) *Attorney, Agent, or Firm* — Schwegman, Lundberg & Woessner

(57) ABSTRACT

Various embodiments herein each include at least one of systems, methods, software, and data flows for automatic processing of foreign currency tenderings, such as on Point-Of-Sale (POS) terminals and other devices and system on which currency transactions may be conducted. One method embodiment includes receiving an image of an image flow captured by a camera of a scanner and determining whether a currency item is present in the image. In such embodiments, when a currency item is determined to be present in the image, sending a data representation of a received currency denomination and value as a currency tender input to a process of a POS terminal.

8 Claims, 5 Drawing Sheets

US 9,864,980 B2

AUTOMATIC PROCESSING OF FOREIGN CURRENCY TENDERINGS

BACKGROUND INFORMATION

As people have become more globally mobile, currency has equally become more globally mobile. One result of this is that store customers more frequently are in possession of foreign currency. While some stores and other businesses have accepted currency at cash registers and teller windows, currency value conversion tables, that are frequently out of date, are used to convert currency. Some more advanced stores and businesses have added a Point-Of-Sale (POS) terminal input option to input currency denomination and amounts and the POS terminal performed the conversion. In these and other solutions that are presently implemented, there are human elements that are time consuming and error prone—both of which are confounds to customer service and well-conducted business.

SUMMARY

Various embodiments herein each include at least one of systems, methods, software, and data flows for automatic processing of foreign currency tenderings, such as on Point-Of-Sale (POS) terminals and other devices and system on which currency transactions may be conducted.

One method embodiment includes receiving an image of an image flow captured by a camera of a scanner and determining whether a currency item is present in the image. In such embodiments, when a currency item is determined to be present in the image, sending a data representation of a received currency denomination and value as a currency tender input to a process of a POS terminal.

Another method embodiment includes receiving, by a process of a POS terminal, a currency representation input of received currency, the currency representation input including data representative of a currency denomination and a currency value. This method further includes converting the currency value of the received currency representation input from the currency representation input currency denomination to a standard denomination of the POS terminal to obtain a converted value and then adding the converted value as a tendered currency amount to a transaction being processed on the POS terminal.

A further example embodiment is in the form of a system. One such system embodiment includes at least one input device, at least one processor, and at least one memory device. In this embodiment, instructions are stored in the at least one memory device that are executable by the at least one processor to perform data processing activities. The data processing activities include receiving, by a process of the terminal, a currency representation input of received currency, the currency representation input including data representative of a currency denomination and a currency value. The data processing activities also include converting the currency value of the received currency representation input from the currency representation input currency denomination to a standard denomination of the terminal to obtain a converted value. The converted value is then added as a tendered currency amount to a transaction being processed on the terminal.

DETAILED DESCRIPTION

Figure 1:
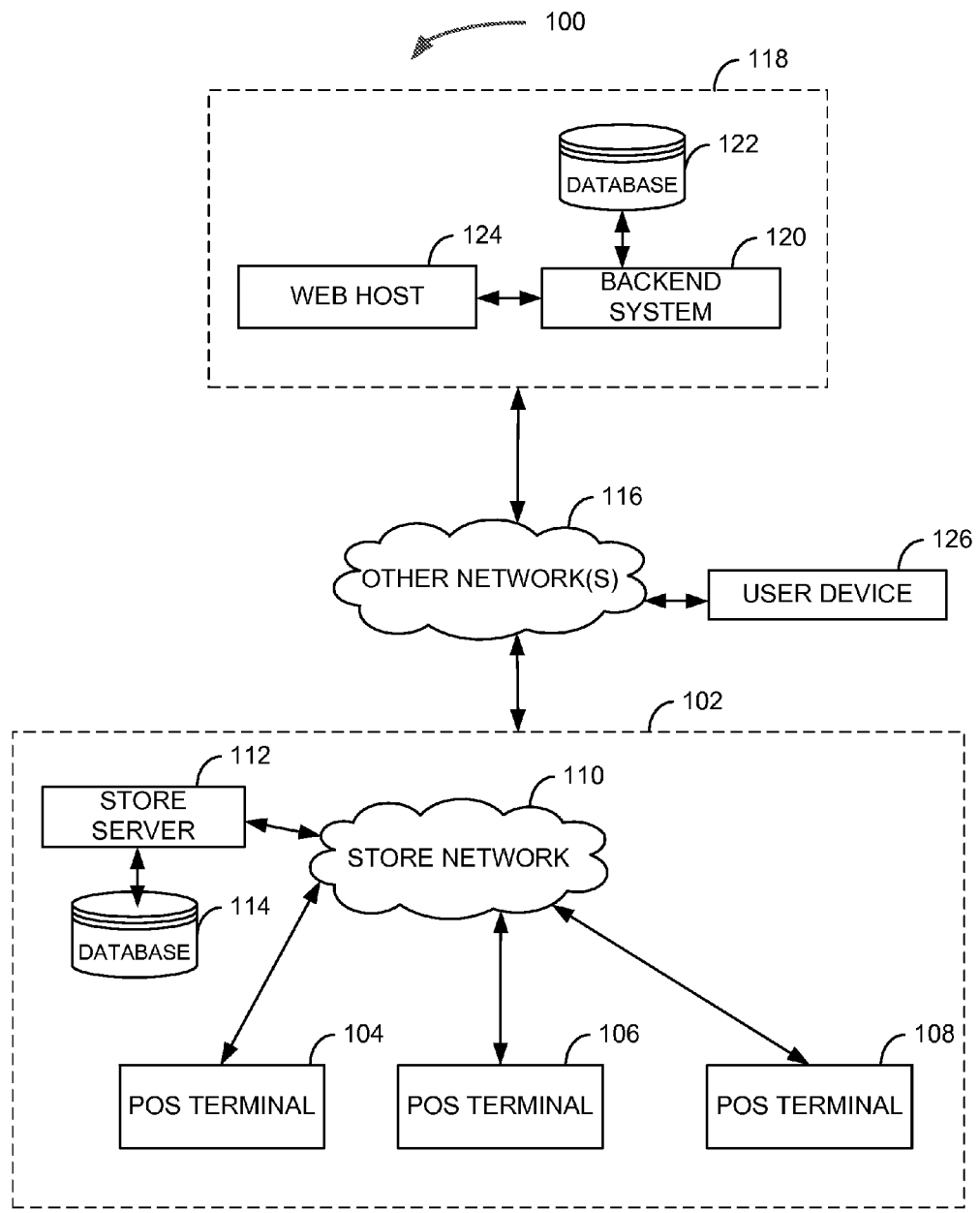
FIG. 1 is a logical block diagram of a system architecture, according to an example embodiment.

Various embodiments herein each include at least one of systems, methods, software, and data flows for automatic processing of foreign currency tenderings, such as on POS terminals, commonly referred to as cash registers, mobile devices, and other devices and systems on which currency transactions may be conducted. Some embodiments include an imaging device, such as a camera or bill validator. Embodiments that include a camera process images of currency to identify a denomination of the currency and a denomination value. Similar operations may be performed by a bill validator, which operates to provide a currency denomination and denomination values of tendered currency bills. The denomination and denomination value are received by a process of the POS terminal, which then converts the value of received currency to a standard denomination of the POS terminal. For example, a Mexican Peso value may be converted to United States Dollars, based on currency conversion data that may be stored locally on the POS terminal or may be accessed via a network by the POS terminal. The converted value is then automatically added to a tendered currency amount of a current transaction on the POS terminal. Processing of the transaction on the POS terminal then proceeds, such as by receiving an additional currency tender or completing the transaction.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The system 100 is an example of a computing environment within which various embodiments may be implemented. The system 100 architecture is provided as only one example architecture on which some embodiments may be implemented. Other architectures may be utilized in other embodiments.

The system 100 includes a store 102 and a remote data processing center 118. The remote data processing center, in some embodiments, may be a corporate or regional data processing center of an entity that operates the store 102. In other embodiments, the data processing center 118 may be operated by an entity providing transaction processing services with regard to transaction data received from stores 102 over one or more other networks 116. Thus, although only a single store 102 is illustrated, in various embodiments there may be many stores 102.

The store 102, as illustrated, includes three POS terminals (104, 106, 108 connected to a store network 110. In some embodiments, the store 102 also includes a store server 112 that may include a database 114 thereon or as may otherwise be accessible via the store network 110. Although three POS terminals 104, 106, 108 are illustrated, the store 102 may include fewer or greater numbers of POS terminals. The POS terminals 104, 106, 108 may include one or a combination of various terminal types. For example, the POS terminals 104, 106, 108 may include standard cashier operated POS terminals, self-checkout terminals where a clerk attending to one or more of such terminals may be called to provide age verification input, a mobile device terminal (e.g., a POS app that executes on a mobile telephone, computer, or tablet), and the like. Generally speaking, the POS terminals 104, 106, 108 are a form of computing device that executes software to process purchase transactions, receive input with regard to tendered payments, and to locally store or provide data with regard to processed purchase transactions to at least one computing system, such as a store server 112 and a backend system 120. Note however that in some embodiments, a user device 126, such as a smartphone, tablet, personal computer, or other device may be used as or in conjunction with a POS terminal.

As mentioned, the store 102 may also include a store server 112 in some embodiments. The store server 112 may receive transaction data from the POS terminals 104, 106, 108 and process the transactions thereon or forward the transaction data to the backend system 120 for processing. The store server 112 may store received transaction data to a database 114 or the POS terminals 104, 106, 108 may instead store such data directly to the database 114 via the store network 110.

However, not all embodiments will include a store server 112 and database 114 within the store 102. In other embodiments where the store 102 does not include a store server 112 and database 114, the transaction data may instead be provided by the POS terminals 104, 106, 108 to a backend system 120 and database 122 located in a data processing center 118 accessible via one or more of the store network 110 and one or more other networks 116. The one or more other networks 116 may include one or more of a virtual private network, a wide area network, the Internet, a network operated by a wireless service provider, dedicated and leased networks, and the like. Regardless of the network and network types over which the data may be provided to the backend system 120 and database 122, the data may be provided from the POS terminals 104, 106, 108 in either a push or pull types of arrangements.

In various embodiments, currency denomination conversion data may be stored on one or more of the POS terminals 104, 106, 108, the database 114 located in the store, and the database 122 within the data processing center 118. In some embodiments, currency denomination data may be stored or otherwise accessed from one or more other locations via one or more other networks, such as the Internet.

In operation, some embodiment include a POS terminal 104, 106, 108 process, during the processing of a transaction, receiving data indicative of a currency denomination and amount tendered by a customer. That data may be received from a bill validator that receives currency tendered by the customer, an image processing process that receives an image of customer tendered currency and identifies the denomination and value thereof, or other device or process. Such image processing processes typically receive an image from an imaging device of the POS terminal, which could be a camera of a product scanner, a camera of the POS terminal, and even a camera of a mobile device when the POS terminal 104, 106, 108 is implemented on such a device. The POS terminal 104, 106, 108 process upon receipt of the currency denomination and value data then converts the denomination value to a standard denomination of the POS terminal 104, 106, 108 based on stored or accessible currency conversion data as described in the preceding paragraph. Once the tendered currency value is converted to the standard denomination value, the standard denomination value is added to a currency tendered amount within the current transaction on the POS terminal 104, 106, 108 and processing of the transaction proceeds.

Figure 2:
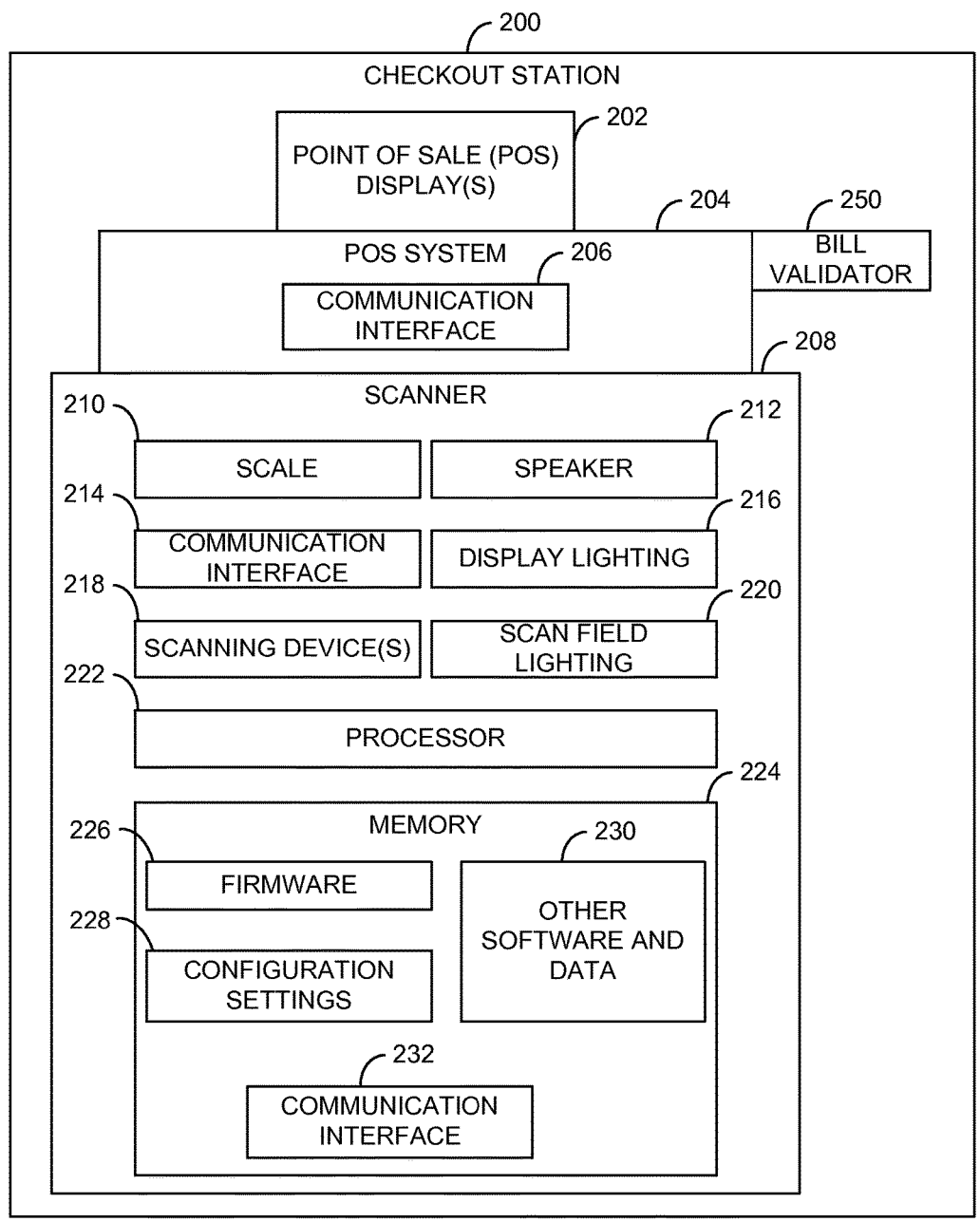
FIG. 2 is a diagram illustrating components of a checkout station having a scanner, according to an example embodiment.

FIG. 2 is a diagram illustrating components of a checkout station 200 having a scanner 208, according to an example embodiment. It is to be noted that the checkout station 200 is shown schematically in greatly simplified form, with example components relevant to understanding various embodiments herein. The same situation may be true for the other various components of the checkout station 200. Note that the checkout station 200 may include more or fewer components in some embodiments.

Furthermore, the various components included in the FIG. 2 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 200. Further, although a checkout station 200 is illustrated as including a scanner 208, the scanner 208 may be a stand-alone element or an element of other systems, devices, and terminals in other embodiment. Examples of other terminal-types that may include a scanner 208 are self-service terminals (SSTs), clerk operated and self-service library checkout stations, time-keeping terminals, Pay-at-the-Pump terminals on a fuels pump at a fueling station, and the like.

Also, scanner 208 may also include or be a handheld scanner that is connected to the POS system via a wired or wireless connection.

Some other embodiments of the checkout station 200 may also include a bill validator device 250. The bill validator device 250 may be present in some embodiments that do not include a scanner 208. Additionally, in some embodiments, rather than the embodiment being built around a checkout station 200, the embodiment is built around another device-type such as a gaming machine or Automatic Teller Machine (ATM). Regardless, the bill validator device 250 is a device that receives currency bills, identifies a currency denomination and value of a received currency bill, and outputs data representative thereof to an appropriate device or process.

The methods of some embodiments are programmed as executable instructions in memory and/or non-transitory computer-readable storage media and executed on one or more processors and other such data processing devices associated with the components and devices herein.

The checkout station 200 includes one or more POS displays 202 that present information of a POS system 204 coupled to the one or more POS displays. Information presented by the one or more POS displays includes information relevant in a retail context and with regard to operation of the checkout station. The checkout station 200 also includes the scanner 208.

The scanner 208 may be referred to as a barcode scanner as that is the task most commonly associated with such devices. An example of such a barcode scanner is the NCR RealScan™ 7879 Bi-Optic Imager available from NCR Corporation of Duluth, Ga. During operation of the checkout station 200, items are placed within a scan field of the scanner 208. One or more scanning devices 218 of the scanner 208, such as one or more of a camera and a laser scanner then scan a barcode and information read therefrom is communicated to the POS system 204. The POS system 204 then uses that data to identify the item placed within the scan field of the scanner 208 and performs an additional function. The additional function may include a price lookup and addition of the item to a list of items to be purchased, which may be presented on the one or more POS displays 202.

The scanner 208 may include one or more scan fields, such as two scan fields of bi-optic scanners that are commonly seen in grocery and discount retail outlets. In addition to the scanning devices 218, the scanner 208 may include various other components. The various other components may include an integrated scale 210 such as may be used in a grocery outlet to weigh produce and one or both of a speaker 212 and display lighting 216 to output audio a visual signals such as signals of (un)successful scans. The scanner 208 may also include scan field lighting 220 that may be turned on and off and adjusted based on a detected presence of an item to be scanned.

During typical operation, the scanner 208 is operated according to instructions executed on a processor 222. The processor may be an application integrated circuit (ASIC), digital signal processor, microprocessor, or other type of processor. The instructions may be firmware 226 or software 230 stored in one or more memories 224. The one or more memories 224 may be or include volatile and non-volatile memories, write-protected memories, write-once memories, random access memory (RAM), read only memories (ROM), and other memory and data storage types and devices.

The instructions as may be stored in firmware 226 or as software 230 in memory 224 are executed according to configuration settings stored in the memory 224. The configuration settings 228 configure operation of the scanner 208, the various components, both hardware and software, therein. For example, the configuration settings 208 may configure speaker 212 volume, display lighting 216 outputs, scan field lighting 220 brightness, decoding algorithm of the scanning device(s) 218 and the instructions, one or more communication protocols used to communicate data from the scanner 208 to the POS system 204, such as via a wired or wireless communication interface 206 of the POS system 204 to a physical communication interface device 214 or virtualized communication interface 232 of the scanner 208. For example, in some embodiments, the communication interface 206 of the POS system 204 is accessible from the scanner 208 as a virtualized communication interface 232 as may be maintained in the memory 224 by a process that executes on the processor 222. Each of the communication interfaces 206, 214 may be wired or wireless communication interface devices, such as a wired Ethernet device, a wireless Ethernet device (e.g., a device capable of communicating according to one or more of the 802.11 standards), Bluetooth® device, a mesh network device or other peer-to-peer type networking device, a mobile network data communication device, and the like.

In some embodiments, the software 230 stored in memory 224 includes instructions executable on the processor 222 to automatically set the configuration settings 228, such as upon scanner 208 installation, completion of scanner 208 maintenance, or other times with regard to the scanner 208. In some embodiments, the software 230 stored in the memory 224 includes instructions executable by the processor 222 to receive an image from a scanner, identify the presence of a currency bill in the image by comparing parameters of currency item profiles with the image. The currency item profiles, in some embodiments, are stored in the configuration settings 228 of the scanner 208 or within a memory of the POS system 204. The image in some embodiments, may be processed in the scanner 208 or may be provided by the scanner 208 to the POS system 204 which then processes the image. The parameters of a currency item profile includes parameters that define a currency item, such as graphical elements and other features that are present on a currency item. A currency item profile also includes data identifying a denomination and a denomination value of the currency item. Thus, when a currency item profile has been matched to an image, the denomination and value of the currency is then also known.

In some embodiments, a group of scanners 208 or POS systems 204 deployed on a network may share a database of currency item profiles accessible via a network by communication interfaces 214 of the respective scanners 208. In other embodiments, the various scanners 208 or POS Systems 204 may synchronize their local currency item profiles in a Peer-to-Peer (P2P) manner or via a network service or shared database accessible via the network.

Figure 3:
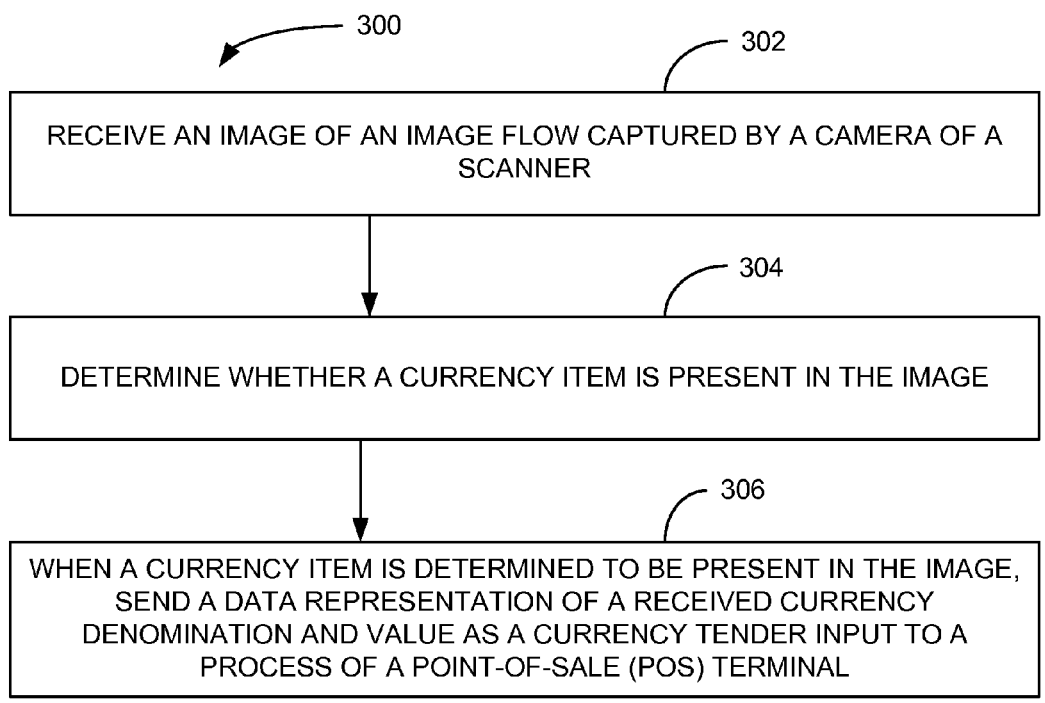
FIG. 3 is a block flow diagram of a method, according to an example embodiment.

FIG. 3 is a block flow diagram of a method 300, according to an example embodiment. More specifically, FIG. 3 illustrates a method 300 of operation of the checkout system 200 of FIG. 2 according to some embodiments.

The example method 300 includes receiving 302 an image of an image flow captured by a camera of a scanner and determining 304 whether a currency item is present in the image. When a currency item is determined to be present in the image, the method 300 includes sending 306 a data representation of a received currency denomination and value as a currency tender input to a process of a Point-Of-Sale (POS) terminal. The method 300, in some embodiments, is performed by the scanner 208 of FIG. 2. In other embodiments, the method 300 is performed by a process that executes on the POS system 204 of FIG. 2 upon receipt of the image from the scanner 208.

In some embodiments of the method 300, the image of the image flow from the scanner is a video frame of a video image flow from the scanner.

Determining 304 the currency item is present in the image, in some embodiments of the method 300 includes comparing parameters of currency item profiles with the image to identify a presence of currency item profile parameters in the image. A currency item profile is one of a plurality of currency item profiles applied when determining whether a currency item is present in the image.

In some embodiments, determining 304 whether a currency item is present in the image is performed after receipt of an input command, such as on a POS system or other system on which the method 300 is implemented, during the processing of a transaction.

In some further embodiments, the method 300 is performed by a computing device of a POS terminal upon receipt of the image from a product scanner communicatively coupled to the computing device. In such embodiments, the method 300, when the data representation of the received currency denomination and value has a denomination other than a standard denomination of the POS terminal, the method 300 further includes converting the value of the received data of the denomination from the data representation to the standard denomination of the POS terminal to obtain a converted value. The converted value is then added as a tendered currency amount to the transaction being processed on the POS terminal. Converting the value of the received data of the denomination from the data representation to the standard denomination of the POS terminal is performed, in some embodiments, based on a conversion value retrieved from a database of currency conversion values. The database of currency conversion values from which the conversion value is retrieved may be locally stored on the device performing the method 300 or accessed via a network.

Figure 4:
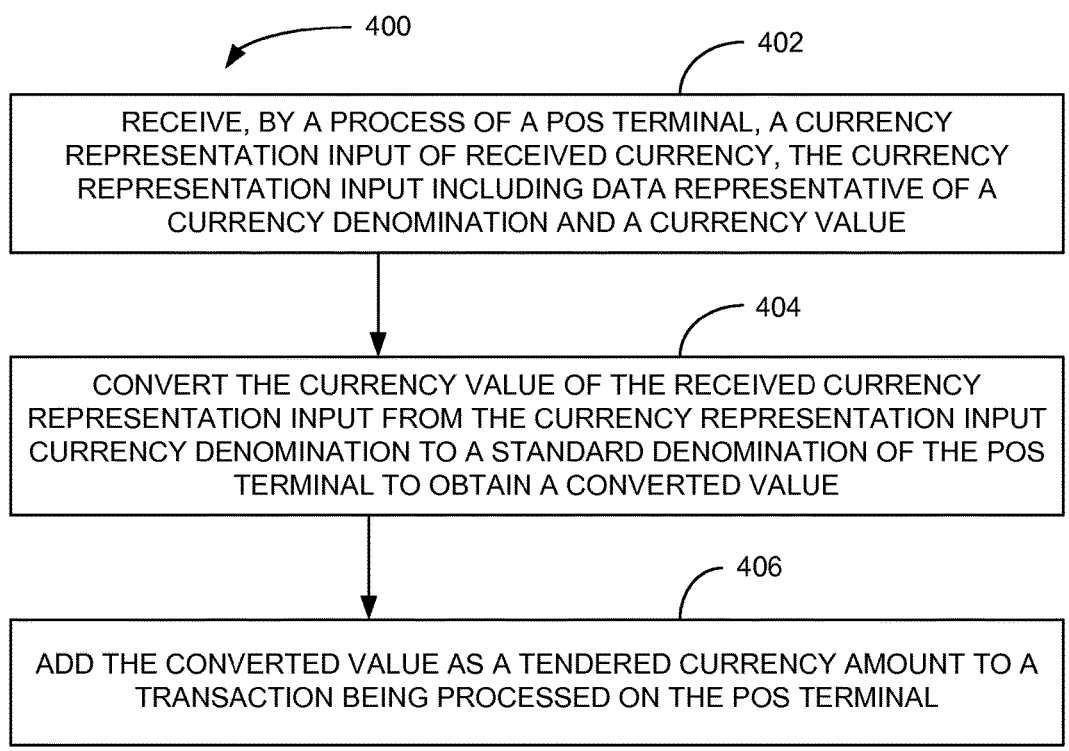
FIG. 4 is a block flow diagram of a method, according to an example embodiment.

FIG. 4 is a block flow diagram of a method 400, according to an example embodiment. The method 400 may be performed on a POS terminal, such as POS System 204 of FIG. 2.

The example method 400 includes receiving 402, by a process of a Point-Of-Sale (POS) terminal, a currency representation input of received currency, the currency representation input including data representative of a currency denomination and a currency value. The currency representation input may be received by a process performing the method 300 of FIG. 3, from a bill validator device such as bill validator device 250 of FIG. 2, or from another device. The method 400 further includes converting 404 the currency value of the received 402 currency representation input from the currency representation input currency denomination to a standard denomination of the POS terminal to obtain a converted value. The converting 404 of the currency value is performed, in some embodiments, based on a conversion value retrieved from a database of currency conversion values. The method 400 then adds 406 the converted value as a tendered currency amount to a transaction being processed on the POS terminal.

Figure 5:
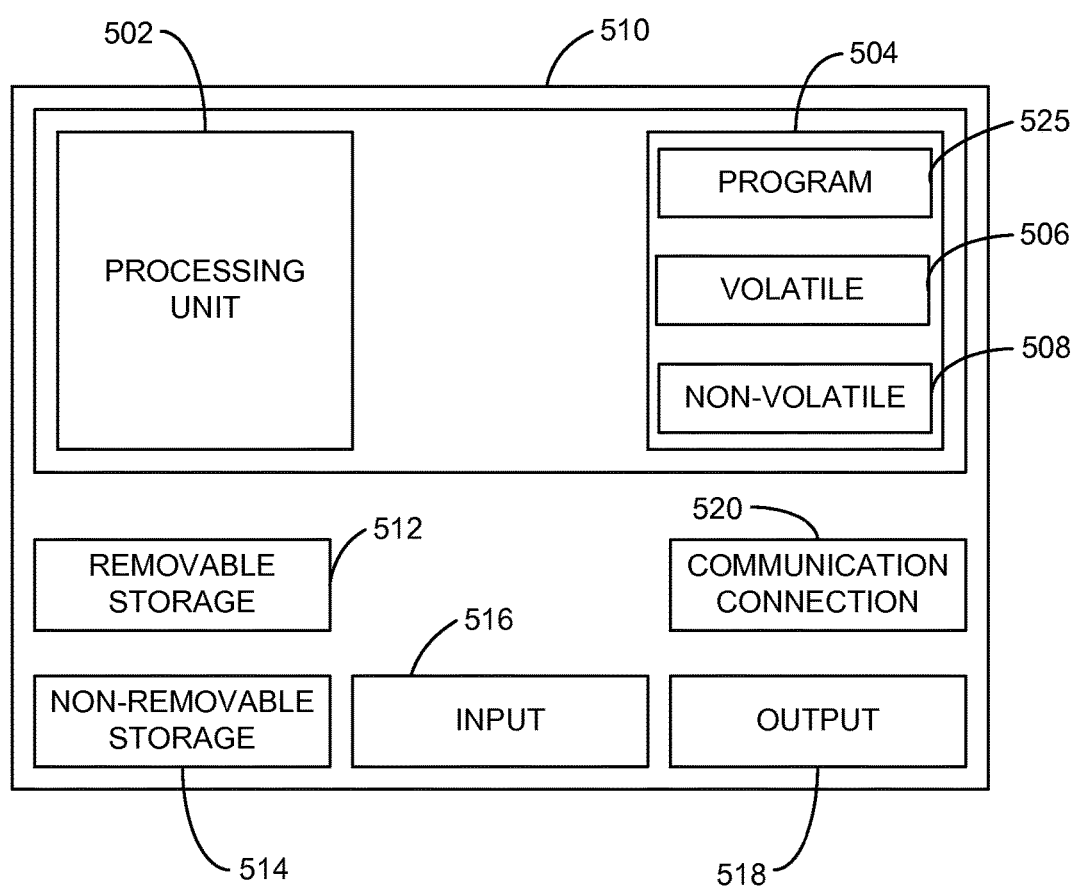
FIG. 5 is a block diagram of a computing device, according to an example embodiment.

FIG. 5 is a block diagram of a computing device, according to an example embodiment. The computing device is an example of a computing device upon which a POS terminal 104, 106, 108 of FIG. 1, or other terminal such as an ATM or gaming machine, may be implemented in whole or in part.

In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

Another embodiment, in the form of a terminal, such as a POS terminal, an ATM, a gaming machine, and the like. The terminal includes at least one input device, at least one processor, and at least one memory device. Instructions are stored in the at least one memory device of the terminal and are executable by the at least one processor to perform data processing activities. The data processing activities include receiving, by a process of the terminal, a currency representation input of received currency, the currency representation input including data representative of a currency denomination and a currency value. The data processing activities also include converting the currency value of the received currency representation input from the currency representation input currency denomination to a standard denomination of the terminal to obtain a converted value. The data processing activities in such embodiments then add the converted value as a tendered currency amount to a transaction being processed on the terminal. In some such embodiments, the at least one input device includes a bill validator device that identifies a tendered currency denomination and currency value.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving an image of an image flow captured by a horizontal camera of a bi-optic product scanner that captured the image from below a presented item;
   determining whether a currency item is present in the image; and
   when a currency item is determined to be present in the image, sending a data representation of a received currency denomination and value as a currency tender input to a process of a Point-Of-Sale (POS) terminal.

2. The method of claim 1, wherein the image of the image flow from the product scanner is a video frame of a video image flow from the product scanner.

3. The method of claim 1, wherein determining the currency item is present in the image includes comparing parameters of currency item profiles with the image to identify a presence of currency item profile parameters in the image.

4. The method of claim 3, wherein a currency item profile is one of a plurality of currency item profiles applied when determining whether a currency item is present in the image.

5. The method of claim 1, wherein the determining whether a currency item is present in the image is performed after receipt of an input command during the processing of a transaction at a point of sale terminal.

6. The method of claim 1, wherein the method is performed by a computing device of the POS terminal upon receipt of the image from the product scanner communicatively coupled to the computing device, the method further comprising:
   when the data representation of the received currency denomination and value has a denomination other than a standard denomination of the POS terminal, converting the value of the received data of the denomination from the data representation to the standard denomination of the POS terminal to obtain a converted value; and
   adding the converted value as a tendered currency amount to the transaction being processed on the POS terminal.

7. The method of claim 6, wherein the converting of the value of the received data of the denomination from the data representation to the standard denomination of the POS terminal to obtain a converted value is performed based on a conversion value retrieved from a database of currency conversion values.

8. The method of claim 7, wherein the database of currency conversion values from which the conversion value is retrieved is accessed via a network.

* * * * *